April 28, 1953　　　C. L. GRIFFIN　　　2,636,753
TOOL JOINT - PIPE CONNECTION
Filed April 19, 1948　　　　　　　　　　　　2 SHEETS—SHEET 1

INVENTOR:
CLAUDE L. GRIFFIN
BY
Murray Robinson
ATTORNEY

April 28, 1953   C. L. GRIFFIN   2,636,753
TOOL JOINT - PIPE CONNECTION
Filed April 19, 1948   2 SHEETS—SHEET 2

INVENTOR:
CLAUDE L. GRIFFIN
BY Murray Robinson
ATTORNEY

Patented Apr. 28, 1953

2,636,753

UNITED STATES PATENT OFFICE 2,636,753

TOOL JOINT-PIPE CONNECTION

Claude L. Griffin, Oklahoma City, Okla.

Application April 19, 1948, Serial No. 21,794

21 Claims. (Cl. 285—151)

1

Two part quickly connectable and disconnectable connections known as tool joints are provided between the sections of a string of rotary drill pipe used in drilling a petroleum well. This invention pertains to a method and construction for connecting a part of a tool joint to the end of a length of drill pipe. More particularly the invention pertains to a combination threaded and shrink-fitted connection for such purpose. The invention is applicable not only to connections between tool joint parts and drill pipes but to similar connections between tool joint parts and drill collars and generally to any connection between two pipe members or even between two solid rods or a rod and a pipe. However, the full benefits of the invention may perhaps not be realized except in a tool joint connection.

It is an object of the invention to provide such a connection which will be fluid tight, and to this end objects of the invention are to provide both parts of the connection with both inner and outer lands in sealing engagement and to provide an inside shoulder seal in addition to a thread seal.

It is another object of the invention to provide such a connection which will be more durable and to this end objects of the invention are to reduce the bending stresses on the thread ends, to seal off the threads from exposure to well fluids, to better distribute the load on the threads, to eliminate galling in make up and break out, to provide more nearly uniform wall thickness, to damp out transverse vibrations and to better distribute the stress on the pipe at the end of the connection.

It is another object of the invention to provide such a connection which will not come apart when in use and to this end objects of the invention are to provide radial stress between thread crest and interthread-root space, to provide radial stress between the lands, to provide interflank stress on the threads, to provide axial stress on the shoulders and threads, to provide friction preventing unscrewing that continues even after the joint is partly unscrewed or is relieved of its self tension through heavy compressive loading, and to provide lands that come into tighter engagement as the joint is placed in tension or compression.

It is another object of the invention to provide such a connection which is more easily and economically manufactured, and to this end objects of the invention are to increase the axial and radial tolerances on the lands and threads, and to provide threads and lands which are more easily cut and gauged.

Other objects and advantages of the invention will become apparent as the description thereof proceeds.

For a detailed description of a preferred em-

2 bodiment of the invention, reference will now be made to the accompanying drawings wherein:

Figures 1, 2, 3, 4:
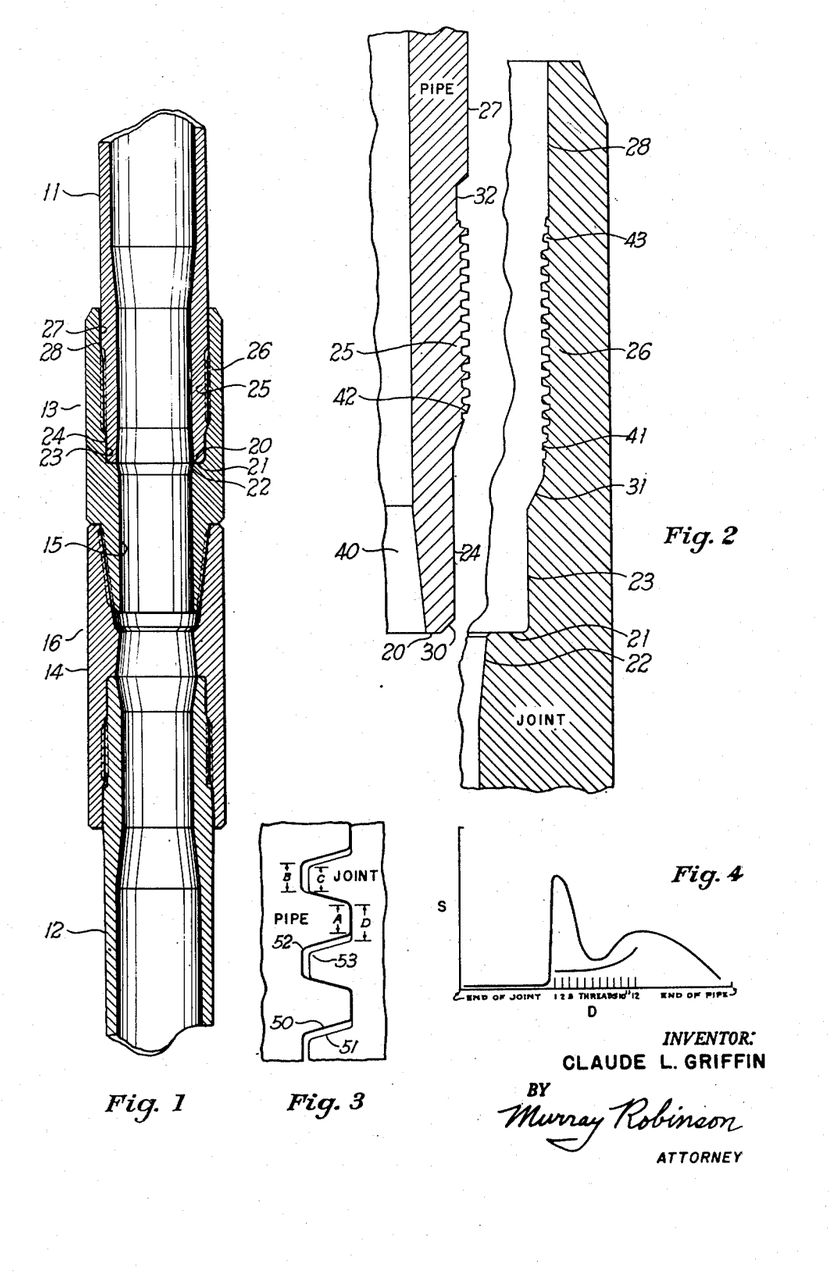
Figure 1 is an axial section through a tool joint and the two pipe ends connected thereto according to the invention.
Figure 2 is a fragmentary axial section through one of the connections with the pipe end and tool joint part separated radially for clarity.
Figure 3 is a fragmentary axial section through the connection, drawn on a much larger scale, showing a portion of the threaded part of the connection.
Figure 4 is a graph showing axial stress on the connection plotted against axial distance along the connection.

Referring to Figure 1, there are shown two pipe ends 11 and 12 to which are connected the two parts 13 and 14 of a tool joint. The two parts of the tool joint are shown as being coupled together by means of a threaded conical pin 15 on tool joint part 13 and a threaded conical socket 16 on tool joint part 14. However, any suitable type of coupling for securing together the two parts 13 and 14 can be used as desired. The connection between the pipe end 11 and tool joint part 13 is the same as that between pipe end 12 and tool joint part 14 so that only one of these connections will be described.

Referring to both Figure 1 and Figure 2, the connection between pipe end 11 and tool joint part 13 is made by shrink-fitting the socket of the joint part 13 over pin formed by the pipe end 11. The extreme end face 20 of pipe end 11 rests against the upper face 21 of an annular shoulder 22 within the joint part 13. The pipe end is provided with a smooth cylindrical area 23 near its extreme end which engages smooth cylindrical area 24 within the joint part. Coarsely threaded cylindrical portion 25 on the pipe end engages coarsely threaded cylindrical portion 26 in the joint part. The thread on portion 25 has a uniform pitch which is the same as that of the thread on the portion 26 when both are at the same temperature and unstressed. Conical portion 27 of the pipe end is in engagement with conical portion 28 of the joint part. The engaged surfaces should all be machined to a fine finish so as to seal.

Referring particularly to Figure 2, there is a space between each of the pairs of engaged surfaces of the connection just referred to. Thus, there is a beveled surface 30 between the end face 20 of the pipe end and the smooth cylindrical nose 24. Also, the nose 24 is longer than the smooth cylindrical portion 23 of the pipe joint so that the portion of the nose 24 farthest removed from end face 20 is not in engagement with the pipe joint. The crest diameter of the threaded portion 26 is greater than the diameter of smooth cylindrical portion 23, there being beveled or conical surface 31 therebetween. Furthermore, there is an unthreaded area 32 between the threaded portion 25 of the pipe end and the conical portion 27 which extends beyond the last portion of the thread on the tool joint so that the pipe end and tool joint are not in engagement over this area. The unthreaded portion 32 is cylindrical and is undercut slightly below the root diameter of the threaded portion 25. The minimum diameter of conical portion 27 slightly exceeds the crest diameter of the threaded portion 26.

The various parts of the connection are suitably shaped to prevent stress concentrations and to provide proper direction of the stress lines. Thus, the inner surface 40 of the nose 24 of the pipe end is conical with the larger diameter at the extreme end of the pipe. This changes the direction of the stress lines produced by radial compression of the end of the pipe, bending them so that they are directed axially.

The inner end 41 of the thread on the tool joint part vanishes into the tool joint, this shape being easily produced on account of the taper on the starting end of the cutter used for making the thread. The inner end 42 of the thread on the pipe end is beveled off along a conical surface terminating at the surface of the nose 24. The outer end 43 of the thread on the tool joint part is beveled off on a conical surface terminating at the outer conical surface 28 of the tool joint part. The outer end of the thread on the pipe terminates in a surface perpendicular to the axis of the pipe formed at the same time that the area 32 is undercut. The gradual threaded terminations on the ends of the thread of the tool joint and the inner end of the thread on the pipe end tend to spread out the stress concentration which would otherwise occur at the root of the last portion of each thread. The undercut area at the termination of the outer portion of the thread on the pipe end constitutes in effect a broadening of the thread groove which serves a like purpose in distributing the stress. It is at the outer termination of the thread on the pipe joint where most failures occur in this type of connection, and the broad undercut area is believed to be particularly effective in reducing stress concentration at this point.

The end face of the pipe and the top surface of the annular shoulder in the joint part are perpendicular to the pipe. If these surfaces were disposed at an acute angle sloping toward the axis of the pipe moving in a direction away from the end of the pipe, the initial compression of the pipe end due to shrink-fitting the tool joint part thereon would tend to wedge the pipe end away from the tool joint part and thus perhaps break the inner seal between the cylindrical surface on the nose of the pipe and the cylindrical surface in the bottom of the socket in the tool joint part. A slope in the opposite direction would also be undesirable because it would support the extreme end of the nose of the pipe against inward radial movement and thus change the direction of the stress lines, making them more nearly radial instead of axial.

Referring to Figure 3, there are shown the details of the construction of the perfect portions of the threads on the pipe and joint. The thread 50 on the pipe is cut deeper than the thread 51 on the joint so that when the two are in engagement the crest of the pipe thread will contact the base cylinder of the joint but the crest of the joint thread will not contact the base cylinder of the pipe. This further tends to reduce stress concentration at the roots of the pipe thread.

The sides of the threads 50 and 51 are sloping, both sloping at the same angle. The width of the crest of the thread on the pipe, indicated at A, is equal to the width of the space between adjacent portions of the thread at B. The width of the crest of the thread on the joint, indicated at C, however, is less than the width of the space B between adjacent portions of the pipe thread, and the width of the space between adjacent portions of the joint thread, indicated at D, is greater than the width A of the crest of the pipe thread. This provides a certain amount of axial clearance between the flanks of the threads when they are engaged. The corners of the threads where the flanks join the flat crests and roots are rounded as shown at 52 and 53.

Figure 5:
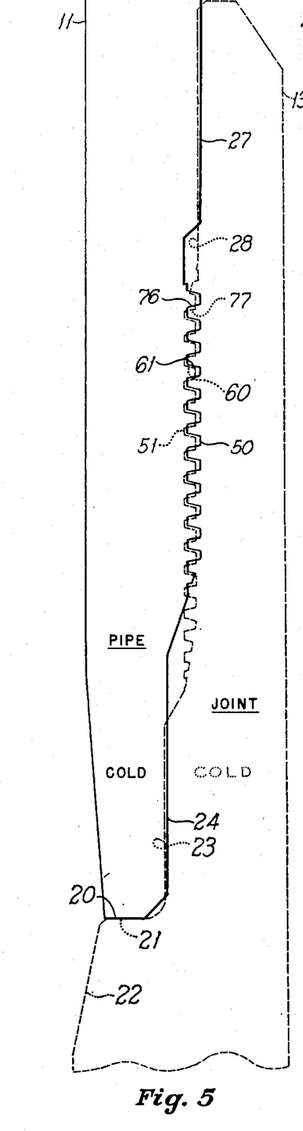
Figure 5 is a profile of an axial section through the connection showing the pipe end as it appears when cold and unstressed with the phantom outline of the cold, unstressed tool joint superimposed thereon in the position it would occupy if its axis were coincident with the axis of the pipe end, the end face of the pipe end were in the same plane as the top face of the annular shoulder in the tool joint, and the pipe end turned about its axis into the same position relative to the tool joint as it occupies when the joint has been heated and screwed hand tight onto the end of the pipe.

The relative diameters of the various parts of the connection when they are at the same temperature and unstressed are best shown in Figure 5. The diameter of the cylindrical portion 23 of the joint is smaller than the diameter of the cylindrical portion 24 of the pipe. Likewise, the diameters of the conical portion 28 of the joint are smaller than the diameters of the conical portion 27 of the pipe taken at equal distances from the plane of the end face 20 of the pipe and the top surface 21 of the annular shoulder 22 of the joint. In other words, the vertex of the conical portion of the joint socket is a shorter axial distance from the mouth of the socket than is the vertex of the conical portion of the pipe when its extreme end face 20 is in the same plane as the face 21 of joint shoulder 22. The crest diameter of the joint thread is smaller than the diameter of the base cylinder of the threaded portion of the pipe and the base cylinder of the threaded portion of the joint has a smaller diameter than the crest diameter of the thread on the pipe. It will also be noted that in the relative position of the pipe end and tool joint shown in Figure 5 with respect to rotation of the joint about the pipe, the distance between the top surface 21 of the joint and the bottom flank of any portion of the thread 51 of the tool joint such as that shown at 60 is less than the distance from the end face 20 of the pipe to the top face 61 of the corresponding portion of the thread 50 on the pipe.

Figure 6:
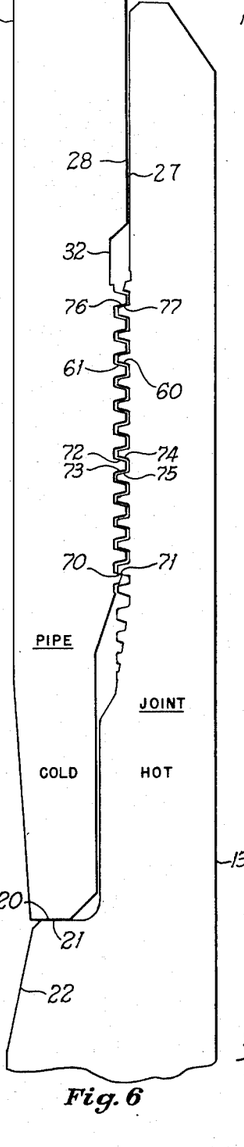
Figure 6 is a profile similar to Figure 5 except that the tool joint is shown as it appears when heated to a temperature sufficient to enable it to be screwed onto the pipe end, the tool joint being shown with full lines since the representation in Figure 6 is of a condition which actually exists when the connection is being assembled.

To connect the tool joint part to the pipe end, the tool joint part is first heated and then screwed by hand onto the pipe end until the extremity of the pipe abuts against the shoulder in the bottom of the socket in the tool joint part. As shown in Figure 6, when the tool joint part is heated to about 800° Fahrenheit while the pipe is left at atmospheric temperature, the diameter of the smooth cylindrical, and threaded cylindrical portions of the joint become larger than the corresponding diameters of the pipe and the vertex of the conical portion of the joint socket moves farther from the mouth of the socket than would be the vertex of the conical portion of the pipe end if the extreme end of the pipe were against the shoulder in the bottom of the socket. To achieve the desired shift in the vertex of the conical portion of the tool joint part, the vertex is initially disposed spaced from the plane of the annular shoulder of the joint part and on the side of the plane opposite from that against which the pipe end is to rest. At the same time the pitch of the thread on the joint part is increased. Since the pitches of the threads are equal when the pipe end and tool joint part are at the same temperature, when the joint part is heated the pitch of its thread is greater than that of the pipe end. However, because the thread on the joint is narrower than the space between the adjacent portions of the thread on the pipe, as previously described in connection with Figure 3, the threads may be engaged without interference so long as the difference between the pitches of the threads multiplied by the length of the threaded portions is less than the difference between the width of the thread on the joint and the space between adjacent portions of the thread on the pipe. In this connection it is to be noted that when the width of the thread on the joint is less than the space between adjacent portions of the thread on the pipe, inherently the width of the thread on the pipe will be less than the space between adjacent portions of the thread on the joint.

The axial clearance between the threads due to the difference between the width of the thread on the tool joint part and the distance between adjacent portions of the thread on the pipe end will be somewhat greater when the tool joint part is hot because of the radial expansion of the joint and the sloping flanks of the threads. It would be possible to rely solely on the axial clearance produced by heating of the joint part if the slope of the thread flanks were sufficiently great and the length of the threaded portion were sufficiently small. In most cases, however, it will be necessary to make the width of the thread on the joint when cold less than the distance between adjacent portions of the thread on the pipe to take care of the change in pitch of the thread on the joint when it is heated.

As shown in Figure 6, the length of the threaded portions is such as to make almost full use of the axial clearance provided. The top flank of the first engaged portion of the pipe thread shown at 70 is in contact with the bottom of the first engaged portion of the joint thread shown at 71 when the joint is made up hand tight on the pipe. Near the middle of the threaded portion both the top and bottom flanks 72 and 73 of the pipe thread are spaced from the adjacent flanks 74 and 75 of the thread on the joint. The bottom flank 76 of the last engaged portion of the thread on the pipe is almost in contact with the top flank 77 on the last engaged portion of the thread on the tool joint part. If the threaded portions had been extended a little further there would be thread interference. As contrasted with Figure 5, in Figure 6 the distance between the flank 71 on the bottom of the first engaged portion of the joint thread from the top face 21 of the annular shoulder 22 in the joint is equal to the distance of the top flank 70 of the first engaged portion of the pipe thread from the end face 20.

The angle of taper of the conical portions 27 and 28 is very important. While a cylindrical outer seal could be used with the construction of the present invention because the shrink fit does away with the necessity for a conical surface for the purpose of securing tight engagement, nevertheless, it is desirable to use a conical surface to help damp out transverse vibrations of the pipe which occur in drilling. However, if a steep taper is used it will be required that the length of the pipe end and the depth of the socket in the tool joint part be held to close tolerances in order that the conical seal surfaces do not prevent the nose of the pipe end from landing on the shoulder in the joint part or alternatively in order that the nose does not land too soon and prevent the conical seal surfaces from engaging. These are the same problems that arise if a conical base thread is used.

According to the invention, the problem is overcome by making the taper angle of the conical surfaces very small. With a very small taper a very small radial spacing between the joint part and pipe end such as exists when the joint part is hot provides a relatively large axial clearance between the two. The taper should be so chosen that with the minimum radial clearance that may exist between the pipe end and the heated joint part under the prescribed tolerances for their respective outer and inner diameters at coplanar transverse sections of their conical surfaces there will be greater axial clearance than the maximum variation in the axial positions of the seal surfaces under the prescribed tolerances for the length of the pipe end and depth of the socket in the tool joint part. The smaller the taper angle, the greater will be this axial clearance for any presented set of axial and radial tolerances. For convenience the maximum degree of taper meeting the foregoing requirements will hereinafter be referred to as the critical taper.

It will be readily apparent from Figure 6 that because of the very slight taper on the conical surfaces 27 and 28 compared to the radial clearance between them, a considerable axial movement of the pipe end into the tool joint part is permissible without the surfaces coming into engagement. Likewise, the pipe end can be moved outwardly with respect to the tool joint part from the position shown without the surfaces separating so much that they will not come together when the joint part cools. The length of the pipe end and the depth of the socket in the tool joint part, or more accurately the distance of the end face 20 of the pipe end from the apex of the conical surface 28 and the distance of the top surface 21 of the shoulder 22 in the joint part from the apex of the conical surface 27 are chosen so as to produce a predetermined radial stress between surfaces 27 and 28 and must be kept to within prescribed tolerances such that their combined maximum deviation does not exceed the axial movement of the pipe and joint from the specified position shown in Figure 6 that is permissible with the taper and radial clearance of surfaces 27 and 28 there shown. The taper shown is three-eighths of an inch per foot measured on diameters, the radial clearance (though exaggerated in the drawing) is not less than half a thousandths of an inch all around, and the combined deviations of pipe length and socket depth are to be held to half a thousandth of an inch. Thus, the conical portions are critically tapered.

After the tool joint part has been made up on the pipe end it is allowed to cool. The outer end of the tool joint part, that is, the part near the mouth of the socket, contains less metal and cools more rapidly than the inner portion near the bottom of the socket. The conical area of the tool joint part will first engage that of the pipe end, then the areas between the adjacent portions of the thread on the joint part will bear against the crest of the thread on the pipe end, then the smooth cylindrical side walls at the bottom of the socket in the joint part will engage the corresponding portion on the inner extremity or nose of the pipe end. During this period the flank of the thread on the joint part that faces the bottom of the socket gradually engages the flank of the thread on the pipe end that faces away from the nose of the pipe end. This flank engagement will occur first at that portion of the threads near the bottom of the socket since that portion is in initial engagement when the joint part is first screwed onto the pipe end. The remainder of the threads come into engagement as the threaded portion of the joint part shrinks both longitudinally and radially. At the same time the flank stress on the already engaged portion of the thread flanks is increased due to the longitudinal shrinkage of the joint part over the nose of the pipe end and also due to the radial shrinkage of the already engaged threaded area of the joint which forces the pipe thread deeper into the space between adjacent portions of the joint thread thereby producing a wedging action on account of the slope of the flanks. In the final shrink a certain amount of shear will be produced axially between the faces of the smooth cylindrical portions and the faces of the conical portions of the joint part and pipe end due to the friction between the engaged faces. The taper angle of the conical portions is well within the angle of repose.

Figure 7:
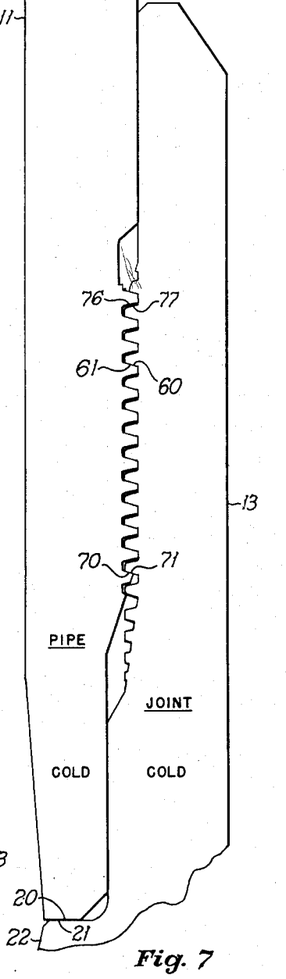
Figure 7 is a view similar to Figure 6 except that it shows the pipe end and tool joint as they appear when the tool joint has cooled to the same temperature as the pipe end after they have been previously assembled with the tool joint heated.

In Figure 7 the joint is shown in the position it occupies after it has cooled and shrunk onto the pipe. In this condition the diameters of the smooth cylindrical and conical portions of the tool joint part are equal to those of the corresponding portions of the pipe and there is a large radial stress between these portions. Also the crest diameter of the thread on the pipe end is equal to the diameter of the base cylinder on the threaded portion of the tool joint and there is radial stress between these portions of the connection. The distance of the bottom flank of the thread on the tool joint part at any given position thereon such as that shown at 60 from the top face 21 of the annular shoulder 22 in the tool joint part is equal to the distance of the top flank of the pipe at a corresponding position such as that shown at 61 from the end face 20 of the pipe. There is an axial stress between these flanks of the threads and also between the end face 20 of the pipe and the top surface 21 of the annular shoulder 22 in the tool joint part. The pipe end 11 is in compression and the tool joint part 13 is in tension throughout the length of the connection.

The above described construction provides an outer seal area between the conical areas of the joint and pipe and two inner seal areas, one between the smooth cylindrical areas and the other between the end face of the pipe and the shoulder in the bottom of the joint socket. These seal areas protect the threaded portions from damage by the drilling mud and other fluids to which both the inside and outside of a drill pipe are exposed when in use. They also stiffen the connection on both sides of the threaded area and thereby prevent high stress concentrations in the relatively sharp bends adjacent the roots of the threads which might otherwise be produced near the terminations of the threads upon bending of the pipe. The inside shoulder prevents the pipe from creeping under torsional load. The shoulder also causes flank stress on the threads when shrunk into engagement. This flank stress together with the radial stress between the crest of the thread on the pipe and the inter-thread space on the joint and the radial stress between the conical areas and the smooth cylindrical areas produces a large amount of friction to prevent the joint from unscrewing.

The inner seal between the smooth cylindrical areas becomes tighter under load, for the inner diameter of the tool joint part tends to reduce when it is placed in tension while the nose end of the pipe reduces very little through tension because the only tension that exists is that due to the friction between the surfaces of the seal areas. Since the pipe end resists compression, the inner diameter of the tool joint part cannot reduce as much as it would if it were placed under the same tension load without the pipe end inside. To compensate for the elongation of the joint there is, therefore, more reduction on the outer diameter which produces great radial stress against the pipe end inside.

The inside cylindrical seal takes some of the load tension off of the threads on the inner end of the connection. When the usual threaded connection is placed in tension the portions of the thread at each end of the connection take most of the load while the central portions of the threads take almost no load. This can best be explained by noting that if the load were distributed equally over the length of the thread, the threaded portion of the pipe near the outer seal would be strained, that is, stretched in the case of a tension load, a great deal more than the adjacent portion of the tool joint part. Likewise, the threaded portion of the joint part near the inner seal would be strained much more than the adjacent portion of the pipe end. Actually, since the threads are in engagement, the strains must be nearly equal. The only way the strains can be equalized is by concentration of the stresses at the ends of the threads.

The cylindrical inner seal of the construction according to the invention can share some of the load with the portions of the threads near it because not being threaded there is no requirement for equality of strain, portions of the pipe end being able to move slightly relative to the joint part to accommodate themselves to unequal stress distribution. It is very desirable to take some of the load stress away from the portions of the threads near the inner seal because these portions of the threads take a much greater share of the stress caused by the initial shrink fit than do the remainder of the threads, this being due to the fact that these portions of the threads are already engaged at the very beginning of the shrink period, as previously explained.

Referring to Figure 4, the short curve shows the distribution of flank stress on the threads of the connection due to the shrink fit. As indicated by the graph, the flank stress is least on those portions of the threads nearest the outer seal and rises sharply at those portions of the threads nearest the inner seal, this being due to the fact previously explained that the portions nearest the inner seal are in engagement prior to the shrinking of the tool joint part. The long curve in Figure 4 represents stress distribution on the flanks of the threads produced by a tension load. The curve is continued beyond the ends of the threaded portion of the connection to indicate the shear stress between the inner and outer seal areas of the connection which also take a certain amount of the load. As shown by the graph, practically none of the tension load is taken by the outer seal area so that there is a high concentration of stress on the flanks of the threaded portion nearest the outer seal area. The flank stress on the portions of the threads near the center of the threaded portion is quite low and there is again a high stress produced on the flanks of the portions of the threads nearest the inner seal. However, this stress is not nearly as high as that produced on the flanks of the portions of the threads near the outer seal because some of the load is distributed to the inner seal as shown by the graph. The total stress on the flanks of the portion of the threads nearest the inner seal will be the sum of the stresses indicated by the two curves. The lower load-produced flank stress on the portions of the threads nearest the inner seal compensates for the higher shrink-produced flank stress on the flanks of the portion of the threads near the inner seal so that the combined stress at this point is not as great as the combined flank stress on the portion of the threads near the outer seal. This is shown as the result of tests wherein the connection has been loaded until failure, in which case the connection always fails by rupture of the pipe at the undercut area 32. Examination of a section through a connection thus pulled apart shows that the portion of the threads nearest the outer seal has undergone permanent deformation whereas the remainder of the threads are not deformed.

The cylindrical base threads of uniform and equal pitch are easily cut to close tolerances, and gauges for such threads are easily produced. The cylindrical base thread produces the maximum possible thickness of metal at the part of the connection near the end of the pipe which is the weakest point in the pipe with respect to radial compression. The cylindrical base threads eliminate the possibility of bursting of the joint due to creepage.

The combination of cylindrical base threads having flat crests and inter-root spaces shrink fitted together produces a joint that is tight even if not made up fully or even if an initial full axial make up is relieved by heavy compressive loading at the bottom of the well or by excessive reverse torque. The provision of a thread on the pipe that is deeper than the thread on the socket insures that only the pipe thread will be compressed in the shrink fitting, thus tending to compress the pipe rather than expand the joint so that a greater stress is produced.

The combination of the cylindrical base threads and cooperating radial shoulders, the whole shrink fitted together, produces a tight fitting joint independent of the lengths of the nose of the pipe end and the depth of the shoulder in the socket of the tool joint part, for after the joint is heated the parts are together until the shoulders formed on the end of the pipe and the bottom of the socket are in contact, the cylindrical base thread permitting the parts to be screwed together as much as necessary to achieve this result. Therefore the tolerances for the lengths of the nose and the depth of the socket need not be held close.

The combination of the cylindrical base threads having sloping flanks shrink fitted together makes a connection that is easily made up tight and broken apart without galling the threads. The thread flanks near the bottom of the joint socket are already in engagement when the joint is first made up and the thread flanks at the mouth of the joint socket cooling first, are soon in engagement too. Thereafter as the joint shrinks radially the sloping flanks of the threads wedge themselves together. Since flank stress is produced by the tapered flank construction, the radial dimensions of the threads need not be held to such close tolerances as would be the case if entire reliance were placed on stress between pipe thread crest and joint inter-thread space.

While a preferred embodiment of the invention has been shown and described, it is obvious that many modifications thereof may be made without department from the spirit of the invention. For example, the invention is applicable equally as well to a connection between a tool joint part and a drill collar as to a connection between a tool joint part and a drill pipe proper and wherever the term drill pipe is used in the claims it is to be understood to include drill collars. Furthermore, while still retaining some though not all the benefits of the invention, the outer seal could be untapered, that is, cylindrical; the threads of the joint part and pipe end could be made of unequal pitch when cold and of the same pitch when the joint part is hot, thereby eliminating in part the need for the inter flank clearance between the threads; the thread on the joint part could be higher than that on the pipe end instead of vice versa; the annular shoulder in the joint part might be placed between the threaded area and the inner seal to cooperate with a similarly disposed shoulder on the pipe end instead of the extremity of the pipe, also the engaged surfaces in the shoulder and pipe end might not be perpendicular to the axis of the connection and might not even be continuous around the circumference of the pipe. It is desired to protect by Letters Patent all forms of the invention falling within the scope of the appended claims. I claim:

1. A pipe connection comprising a drill pipe having on its exterior near one end a threaded portion and a smooth, cylindrical portion on the side of the threaded portion nearest the end of the pipe, and a tool joint part having on its interior near one end a threaded portion and a smooth cylindrical portion on the side of the threaded portion of the tool joint part farthest from said end of the tool joint part, the diameter of the smooth cylindrical portion of the pipe being greater than the diameter of said smooth cylindrical portion of the tool joint part when both are at the same temperature and unstressed, said pipe and tool joint part being connected together with the threaded portion of the pipe lying within and engaging the threaded portion of the tool joint part and the smooth cylindrical portion of the pipe lying within and engaging the smooth cylindrical portion of the tool joint part, whereby axial tension on said connection tightens the engagement of said smooth cylindrical portions.

2. A pipe connection comprising a drill pipe having on its exterior near one end a threaded portion formed on a cylindrical base and a smooth cylindrical portion on the side of the threaded portion nearest the end of the pipe, said pipe being provided with an abutting surface for limiting axial movement of the pipe, said surface lying nearer said end of the pipe than said threaded portion, and a tool joint part having on its interior near one end a threaded portion formed on a cylindrical base and a smooth cylindrical portion on the side of the threaded portion of the tool joint part farthest from said end of the tool joint part, and an abutment inside said tool joint part, said abutment lying farther from said end of the tool joint part than said threaded portion thereof, the diameter of said smooth cylindrical portion of the pipe being greater than the diameter of said smooth cylindrical portion of the tool joint part when both are at the same temperature and unstressed, at least one of the crest diameter and the root diameter of the threaded portion of the pipe being greater than the correlative diameter of the threaded portion of the tool joint part when both are at the same temperature and unstressed, said pipe and tool joint part being connected together with said threaded portion of the pipe lying within said threaded portion of the tool joint part with the thread of the pipe in the space between adjacent portions of the thread on the tool joint part, said abutting surface on the pipe lying against said abutment in the tool joint part, said smooth cylindrical portion of the pipe lying within said smooth cylindrical portion of the tool joint part, said pipe being in axial compression from said abutting surface through said threaded portion thereof and said tool joint part being in axial tension from said abutment through said threaded portion thereof, whereby the flank stress on the portions of said threads near said smooth cylindrical portions, which is initially higher than that on the portions of the threads near said end of the tool joint part due to said axial tension in said tool joint part between said abutment and said threaded portion thereof, will be increased under axial tension load on the connection to a lesser extent than that on said portions of the threads near said end of the tool joint part due to said smooth cylindrical portions of the connection sharing some of the load.

3. A pipe connection comprising a drill pipe having on its exterior near one end a threaded portion formed on a cylindrical base, a smooth cylindrical portion on the side of the threaded portion nearest the end of the pipe, and a smooth conical portion on the other side of the threaded portion having a taper not substantially greater than the critical taper, said pipe having an abutting surface for limiting axial movement of the pipe, said surface lying nearer said end of the pipe than said threaded portion, and a tool joint part having on its interior near one end a threaded portion formed on a cylindrical base, a smooth cylindrical portion on the side of the threaded portion of the tool joint part farthest from said end of the tool joint part, a smooth conical portion on the other side of the threaded portion of the tool joint part having a taper substantially the same as that of said tapered portion of the pipe, and an abutment inside said tool joint part, said abutment lying farther from said end of the tool joint part than said threaded portion thereof, the diameter of said smooth cylindrical portion of the pipe being greater than the diameter of said smooth cylindrical portion of the tool joint part when both are at the same temperature and unstressed, at least one of the crest diameter and the root diameter of the threaded portion of the pipe being greater than the correlative diameter of the threaded portion of the tool joint part when both are at the same temperature and unstressed, the diameters of said conical portion of the pipe being greater than the diameters of said conical portion of the tool joint part at equal distances from said abutting surface of the pipe and the abutment in the tool joint part respectively when both are at the same temperature and unstressed, said pipe and tool joint part being connected together with said threaded portion of the pipe lying within said threaded portion of the tool joint part with the thread of the pipe lying in the space between adjacent portions of the thread of the tool joint part, said abutting surface of the pipe lying against said abutment in the tool joint part, said smooth cylindrical portion of the pipe lying within said smooth cylindrical portion of the tool joint part, and said smooth conical portion of the pipe lying within said smooth conical portion of the tool joint part, said pipe being in axial compression from said abutting surface through said threaded portion thereof and said tool joint part being in axial tension from said abutment through said threaded portion thereof, the limitation of the degree of taper of said smooth conical portions of the connection insuring that said end of the pipe will engage said abutment with sufficient pressure to produce tension in said smooth cylindrical portion of the tool joint part and compression of said smooth cylindrical portion of the pipe whereby flank stress is produced on said threads, and insuring further the engagement of said smooth conical surfaces with sufficient pressure to form a seal.

4. A pipe connection comprising a drill pipe having on its exterior near one end a threaded portion formed on a cylindrical base, a smooth cylindrical portion on the side of the threaded portion nearest the end of the pipe, and a smooth conical portion on the other side of the threaded portion having a taper not substantially greater than the critical taper, said pipe having an abutting surface substantially perpendicular to the axis of the pipe for limiting axial movement of the pipe, said surface lying nearer said end of the pipe than said smooth cylindrical portion, and a tool joint part having on its interior near one end a threaded portion formed on a cylindrical base, a smooth cylindrical portion on the side of the threaded portion of the tool joint part farthest from said end of the tool joint part, a smooth conical portion on the other side of the threaded portion of the tool joint part having a taper substantially the same as that of said tapered portion of the pipe end, and an abutment inside said tool joint part on the side of said threaded portion farthest from said end of the tool joint part, said abutment having a surface perpendicular to the axis of the tool joint part, the diameter of said smooth cylindrical portion of the pipe being greater than the diameter of said smooth cylindrical portion of the tool joint part when both are at the same temperature and unstressed, at least one of the crest diameter and the root diameter of the threaded portion of the pipe being greater than the correlative diameter of the threaded portion of the tool joint part when both are at the same temperature and unstressed, the diameters of said conical portion of the pipe being greater than the diameters of said conical portion of the tool joint part at equal distances from the planes of the abutting surface of the pipe and the surface on said abutment in the tool joint part respectively when both are at the same temperature and unstressed, said pipe and tool joint part being connected together with said threaded portion of the pipe lying within said threaded portion of the tool joint part with the thread of the pipe lying in the space between adjacent portions of the thread of the tool joint part, said abutting surface of the pipe lying against said surface of said abutment in the tool joint part, said smooth cylindrical portion of the pipe being in axial compression and lying within the smooth cylindrical portion of the tool joint part, the last said portion being in axial tension, and said smooth conical portion of the pipe lying within said smooth conical portion of the tool joint part.

5. In combination, a drill pipe having on its exterior near one end a threaded portion formed on a cylindrical base, said pipe having a smooth annular abutting surface of revolution with respect to the axis of the pipe for limiting axial movement of the pipe, said surface lying nearer said end of the pipe than said threaded portion, and a tool joint part having on its interior near one end a threaded portion formed on a cylindrical base and an annular abutment inside said tool joint part on the side of said threaded portion farthest from said end of the tool joint part, said abutment having a smooth annular surface of revolution with respect to the axis of said tool joint part, at least one of the crest diameter and the root diameter of the threaded portion of the pipe being greater than the correlative diameter of the threaded portion of the tool joint part when both are at the same temperature and unstressed, the area of the threaded portion of the pipe which has a greater diameter than the correlative diameter of the tool joint part as aforesaid and also the correlative area of the tool joint part being smooth cylindrical surfaces appearing in cross-section as a flat topped thread to contact a flat inter-thread-root space, said pipe and tool joint part being connected together with said threaded portion of the pipe lying within said threaded portion of the tool joint part with the thread of the pipe lying in the space between adjacent portions of the thread of the tool joint part and said abutting surface of the pipe lying against said surface of said abutment in the tool joint part, said pipe being in axial compression from said abutting surface through said threaded portion thereof and said tool joint part being in axial tension from said surface of said abutment through said threaded portion thereof.

6. In combination, a drill pipe having on its exterior near one end a threaded portion formed on a cylindrical base, the extreme end of said pipe being a smooth annular flat surface lying in a plane substantially perpendicular to the axis of the pipe, and a tool joint part having on its interior near one end a threaded portion formed on a cylindrical base, and an annular shoulder inside said tool joint part on the side of said threaded portion farthest from said end of the tool joint part, said shoulder having a smooth flat annular surface lying in a plane perpendicular to the axis of the tool joint part, at least one of the crest diameter and the root diameter of the threaded portion of the pipe being greater than the correlative diameter of the threaded portion of the tool joint part when both are at the same temperature and unstressed, the area of the threaded portion of the pipe which has a greater diameter than the correlative diameter of the tool joint part as aforesaid and also the correlative area of the tool joint part being smooth cylindrical surfaces appearing in cross-section as a flat topped thread to contact a flat inter-thread-root space, said pipe and tool joint part being connected together with said threaded portion of the pipe lying within said threaded portion of the tool joint part with the thread of the pipe lying in the space between adjacent portions of the thread of the tool joint part and said extreme end surface of the pipe lying against said surface of the annular shoulder of the tool joint part, said pipe being in axial compression from said extreme end surface of the pipe through said threaded portion thereof and said tool joint part being in axial tension from said surface on said shoulder therein through said threaded portion thereof.

7. In combination, a drill pipe having on its exterior near one end a threaded portion formed on a cylindrical base and a smooth cylindrical portion on the side of the threaded portion nearest the end of the pipe, the extreme end of said pipe being a smooth, annular, flat surface lying in a plane substantially perpendicular to the axis of the pipe, and a tool joint part having on its interior near one end a threaded portion formed on a cylindrical base and a smooth cylindrical portion on the side of the threaded portion of the tool joint part farthest from said end of the tool joint part, and an annular shoulder inside said tool joint part on the side of the smooth cylindrical portion thereof opposite said threaded portion thereof, said shoulder having a smooth, flat, annular surface lying in a plane substantially perpendicular to the axis of the tool joint part, the diameter of said smooth cylindrical portion of the pipe being greater than the diameter of said smooth cylindrical portion of the tool joint part when both are at the same temperature and unstressed, at least one of the crest diameter and the root diameter of the threaded portion of the pipe being greater than the correlative diameter of the threaded portion of the tool joint part when both are at the same temperature and unstressed, said pipe and tool joint part being connected together with the area of the threaded portion of the pipe which has a greater diameter than the correlative diameter of the tool joint part as aforesaid and also the correlative area of the tool joint part being smooth cylindrical surfaces appearing in cross-section as a flat topped thread to contact a flat inter-thread-root space, said threaded portion of the pipe lying within said threaded portion of the tool joint part with the thread of the pipe lying in the space between adjacent portions of the thread of the tool joint part, said extreme end surface of the pipe lying against said surface of the annular shoulder of the tool joint part, said smooth cylindrical portion of the pipe being in axial compression and lying within said smooth cylindrical portion of the tool joint part, the last said portion being in axial tension.

8. In combination, a drill pipe having on its exterior near one end a threaded portion formed on a cylindrical base, a smooth cylindrical portion on the side of the threaded portion nearest the end of the pipe, and a smooth conical portion on the other side of the threaded portion having a taper not substantially greater than the critical taper, the extreme end of said pipe being a smooth annular flat surface lying in a plane substantially perpendicular to the axis of the pipe, and a tool joint part having on its interior near one end a threaded portion formed on a cylindrical base, a smooth cylindrical portion on the side of the threaded portion of the tool joint part farthest from said end of the tool joint part, a smooth conical portion on the other side of the threaded portion of the tool joint part having a taper substantially the same as that of said tapered portion of the pipe, and an annular shoulder inside said tool joint part on the side of said smooth cylindrical portion thereof opposite said threaded portion thereof, said shoulder having a smooth flat surface lying in a plane perpendicular to the axis of the tool joint part, the diameter of said smooth cylindrical portion of the pipe being greater than the diameter of said smooth cylindrical portion of the tool joint part when both are at the same temperature and unstressed, at least one of the crest diameter and the root diameter of the threaded portion of the pipe being greater than the correlative diameter of the threaded portion of the tool joint part when both are at the same temperature and unstressed, the diameters of the area of the threaded portion of the pipe which has a greater diameter than the correlative diameter of the tool joint part as aforesaid and also the correlative area of the tool joint part being smooth cylindrical surfaces appearing in cross-section as a flat topped thread to contact a flat inter-thread-root space, said conical portion of the pipe being greater than the diameters of said conical portion of the tool joint part at equal distances from said planes of the extreme end face of the pipe and the annular shoulder of the tool joint part respectively when both are at the same temperature and unstressed, said pipe and tool joint part being connected together with said threaded portion of the pipe lying within said threaded portion of the tool joint part with the thread of the pipe lying in the space between adjacent portions of the thread of the tool joint part, said extreme end surface of the pipe lying against said surface of the annular shoulder of the tool joint part, said smooth cylindrical portion of the pipe being in axial compression and lying within the smooth cylindrical portion of the tool joint part, the last said portion being in axial tension, and the smooth conical portion of the pipe lying within the smooth conical portion of the tool joint part.

9. In combination, a drill pipe having on its exterior near one end a threaded portion formed on a cylindrical base, said pipe having an abutting surface for limiting axial movement of the pipe, said surface lying nearer said end of the pipe than said threaded portion, and a tool joint part having on its interior near one end a threaded portion formed on a cylindrical base, and an abutment inside said tool joint part on the side of said threaded portion farthest from said end of the tool joint part, the threads of said pipe and tool joint part being of equal pitch when at the same temperature and unstressed and the spaces between adjacent portions of the thread on the pipe being wider than the thickness of the thread on the tool joint part, at least one of the crest diameter and the root diameter of the threaded portion of the pipe being greater than the correlative diameter of the threaded portion of the tool joint part when both are at the same temperature and unstressed, said pipe and tool joint part being connected together with said threaded portion of the pipe lying within said threaded portion of the tool joint part with the thread of the pipe lying in the space between adjacent portions of the thread of the tool joint part and said abutting surface of the pipe lying against said abutment in the tool joint part, said pipe being in axial compression from said abutting surface through said threaded portion thereof and said tool joint part being in axial tension from said abutment through said threaded portion thereof.

10. In combination, a drill pipe having on its exterior near one end a threaded portion formed on a cylindrical base, said pipe having an abutting surface for limiting axial movement of the pipe, said surface lying nearer said end of the pipe than said threaded portion, and a tool joint part having on its interior near one end a threaded portion formed on a cylindrical base and an annular abutment inside said tool joint part on the side of said threaded portion farthest from said end of the tool joint part, said abutment having a smooth annular surface of revolution with respect to the axis of said tool joint part, the threads of said pipe and tool joint part having sloping flank surfaces on the sides of the threads opposite from said ends of the pipe and tool joint part respectively, at least one of the crest diameter and the root diameter of the threaded portion of the pipe being greater than the correlative diameter of the threaded portion of the tool joint part when both are at the same temperature and unstressed, the area of the threaded portion of the pipe which has a greater diameter than the correlative diameter of the tool joint part as aforesaid and also the correlative area of the tool joint part being smooth cylindrical surfaces appearing in cross-section as a flat topped thread engaging a flat inter-thread-root space, said pipe and tool joint part being connected together with said threaded portion of the pipe lying within said threaded portion of the tool joint part with the thread of the pipe lying in the space between adjacent portions of the thread of the tool joint part and said abutting surface of the pipe lying against said abutment in the tool joint part, said pipe being in axial compression from said abutting surface through said threaded portion thereof and said tool joint part being in axial tension from said abutment through said threaded portion thereof.

11. In combination, a drill pipe having on its exterior near one end a threaded portion formed on a cylindrical base, said pipe having an abutting surface for limiting axial movement of the pipe, said surface lying near said end of the pipe than said threaded portion, and a tool joint part having on its interior near one end a threaded portion formed on a cylindrical base, and an abutment inside said tool joint part on the side of said threaded portion farthest from said end of the tool joint part, the threads of said pipe and tool joint part having sloping flank surfaces on the sides of the threads opposite from said ends of the pipe and tool joint part respectively and the threads of said pipe and tool joint part being of equal pitch when at the same temperature and unstressed, the spaces between adjacent portions of the thread on the pipe being wider than the thickness of the thread on the tool joint part, at least one of the crest diameter and the root diameter of the threaded portion of the pipe being greater than the correlative diameter of the threaded portion of the tool joint part when both are at the same temperature and unstressed, said pipe and tool joint part being connected together with said threaded portion of the pipe lying within said threaded portion of the tool joint part with the thread of the pipe lying in the space between adjacent portions of the thread of the tool joint part and said abutting surface of the pipe lying against said abutment in the tool joint part, said pipe being in axial compression from said abutting surface through said threaded portion thereof and said tool joint part being in axial tension from said abutment through said threaded portion thereof.

12. In combination, a drill pipe having on its exterior near one end a threaded portion formed on a cylindrical base and a smooth cylindrical portion on the side of the threaded portion nearest the end of the pipe, said pipe being provided with an abutting surface for limiting axial movement of the pipe, said surface lying nearer said end of the pipe than said smooth cylindrical portion, and a tool joint part having on its interior near one end a threaded portion formed on a cylindrical base and a smooth cylindrical portion on the side of the threaded portion of the tool joint part farthest from said end of the tool joint part, and an abutment inside said tool joint part on the side of the smooth cylindrical portion thereof opposite said threaded portion thereof, the threads of said pipe and tool joint part having sloping flank surfaces on the sides of the threads opposite from said ends of the pipe and tool joint part respectively, the diameter of said smooth cylindrical portion of the pipe being greater than the diameter of said smooth cylindrical portion of the tool joint part when both are at the same temperature and unstressed, at least one of the crest diameter and the root diameter of the threaded portion of the pipe being greater than the correlative diameter of the threaded portion of the tool joint part when both are at the same temperature and unstressed, said pipe and tool joint part being connected together with said threaded portion of the pipe lying within said threaded portion of the tool joint part with the thread of the pipe lying in the space between adjacent portions of the thread on the tool joint part, said abutting surface on the pipe lying against said abutment in the tool joint part, and said smooth cylindrical portion of the pipe being in axial compression and lying within said smooth cylindrical portion of the tool joint part, the last said portion being in axial tension.

13. In combination, a drill pipe having on its exterior near one end a threaded portion formed on a cylindrical base, a smooth cylindrical portion on the side of the threaded portion nearest the end of the pipe, and a smooth conical portion on the other side of the threaded portion having a taper not substantially greater than the critical taper, said pipe having an abutting surface for limiting axial movement of the pipe, said surface lying nearer said end of the pipe than said smooth cylindrical portion, and a tool joint part having on its interior near one end a threaded portion formed on a cylindrical base, a smooth cylindrical portion on the side of the threaded portion of the tool joint part farthest from said end of the tool joint part, a smooth conical portion on the other side of the threaded portion of the tool joint part having a taper substantially the same as that of said tapered portion of the pipe end, and an abutment inside said tool joint part on the side of said smooth cylindrical portion thereof opposite said threaded portion thereof, the threads of said pipe and tool joint part having sloping flank surfaces on the sides of the threads opposite from said ends of the pipe and tool joint part respectively, the diameter of said smooth cylindrical portion of the pipe being greater than the diameter of said smooth cylindrical portion of the tool joint part when both are at the same temperature and unstressed, at least one of the crest diameter and the root diameter of the threaded portion of the pipe being greater than the correlative diameter of the threaded portion of the tool joint part when both are at the same temperature and unstressed, the diameters of said conical portion of the pipe being greater than the diameters of said conical portion of the tool joint part at equal distances from said abutting surface of the pipe and the abutment in the tool joint part respectively when both are at the same temperature and unstressed, said pipe and tool joint part being connected together with said threaded portion of the pipe lying within said threaded portion of the tool joint part with the thread of the pipe lying in the space between adjacent portions of the thread of the tool joint part, said abutting surface of the pipe lying against said abutment in the tool joint part, said smooth cylindrical portion of the pipe being in axial compression and lying within said smooth cylindrical portion of the tool joint part, the last said portion being in axial tension, and the smooth conical portion of the pipe lying within the smooth conical portion of the tool joint part.

14. In combination, a drill pipe having on its exterior near one end a threaded portion formed on a cylindrical base, said pipe having an abutting surface for limiting axial movement of the pipe, said surface lying nearer said end of the pipe than said threaded portion, and a tool joint part having on its interior near one end a threaded portion formed on a cylindrical base, and an abutment inside said tool joint part on the side of said threaded portion farthest from said end of the tool joint part, the threads of said pipe and tool joint part having sloping flank surfaces on the sides of the threads opposite from said ends of the pipe and tool joint part respectively and being of equal pitch when at the same temperature and unstressed and the spaces between adjacent portions of the thread on the pipe being wider than the thickness of the thread on the tool joint part, the thread on the pipe being higher than the thread on the tool joint part, the crest diameter of the threaded portion of the pipe being greater than the root diameter of the threaded portion of the tool joint part when both are at the same temperature and unstressed, said pipe and tool joint part being connected together with said threaded portion of the pipe lying within said threaded portion of the tool joint part with the thread of the pipe lying in the space between adjacent portions of the thread of the tool joint part and said abutting surface of the pipe lying against said abutment in the tool joint part, said pipe being in axial compression from said abutting surface through said threaded portion thereof and said tool joint part being in axial tension from said abutment through said threaded portion thereof.

15. In combination, a drill pipe having on its exterior near one end a threaded portion formed on a cylindrical base, the extreme end of said pipe being a smooth annular flat surface lying in a plane substantially perpendicular to the axis of the pipe, and a tool joint part having on its interior near one end a threaded portion formed on a cylindrical base, and an annular shoulder inside said tool joint part on the side of said threaded portion farthest from said end of the tool joint part, said shoulder having a smooth flat annular surface lying in a plane perpendicular to the axis of the tool joint part, the threads of said pipe and tool joint part having sloping flank surfaces on the sides of the threads opposite from said ends of the pipe and tool joint part respectively and being of equal pitch when at the same temperature and unstressed and the spaces between adjacent portions of the thread on the pipe being wider than the thickness of the thread on the tool joint part, the thread on the pipe being higher than the thread on the tool joint part, the inter-root space on the joint and the top of the thread on the pipe being flat in cross-section and being cylindrical surfaces parallel to the pipe and joint axes, the crest diameter of the threaded portion of the pipe being greater than the root diameter of the threaded portion of the tool joint part when both are at the same temperature and unstressed, said pipe and tool joint part being connected together with said threaded portion of the pipe lying within said threaded portion of the tool joint part with the thread of the pipe lying in the space between adjacent portions of the thread of the tool joint part and said extreme end surface of the pipe lying against said surface of the annular shoulder of the tool joint part, said pipe being in axial compression from said extreme end surface of the pipe through said threaded portion thereof and said tool joint part being in axial tension from said surface on said shoulder therein through said threaded portion thereof.

16. A pipe connection comprising a drill pipe having on its exterior near one end a threaded portion formed on a cylindrical base, and a smooth conical portion on the side of the threaded portion farthest from said end of the pipe having a taper not substantially greater than the critical taper, said pipe having an abutting surface for limiting axial movement of the pipe, said surface lying nearer said end of the pipe than said threaded portion, and a tool joint part having on its interior near one end a threaded portion formed on a cylindrical base, a smooth conical portion on the side of the threaded portion nearest said end of the tool joint part having a taper substantially the same as that of said tapered portion of the pipe, and an abutment inside said tool joint part on the side of said threaded portion farthest from said end of the tool joint part, at least one of the crest diameter and the root diameter of the threaded portion of the pipe being greater than the correlative diameter of the threaded portion of the tool joint part when both are at the same temperature and unstressed, the diameters of said conical portion of the pipe being greater than the diameters of said conical portion of the tool joint part at equal distances from said abutting surface of the pipe and the abutment in the tool joint part respectively when both are at the same temperature and unstressed, said pipe and tool joint part being connected together with said threaded portion of the pipe lying within said threaded portion of the tool joint part with the thread of the pipe lying in the space between adjacent portions of the thread of the tool joint part and said abutting surface of the pipe lying against said abutment in the tool joint part and said smooth conical portion of the pipe lying within said smooth conical portion of the tool joint part, said pipe being in axial compression from said abutting surface through said threaded portion thereof and said tool joint part being in axial tension from said abutment through said threaded portion thereof, the limitation on the degree of taper of said smooth conical portions insuring that said end of the pipe is in pressure engagement with said abutment and said smooth conical portions are in sealing engagement with each other.

17. A pin and socket connection comprising a pin having on its exterior near one end a threaded portion formed on a cylindrical base, a smooth cylindrical portion on the side of the threaded portion nearest said end of the pin and a smooth conical portion on the other side of the threaded portion having a taper not substantially greater than the critical taper, said pin having an abutting surface for limiting axial movement of the pin, said surface lying nearer said end of the pin than said smooth cylindrical portion thereof and a socket having on its interior near one end a threaded portion formed on a cylindrical base, a smooth cylindrical portion on the side of the threaded portion of the socket farthest from said end of the socket, a smooth conical portion on the other side of the threaded portion of the socket having a taper substantially the same as that of said threaded portion of the pin, and an abutment inside said socket on the side of said smooth cylindrical portion thereof farthest from said end of the socket, the diameter of said smooth cylindrical portion of the pin being greater than the diameter of the smooth cylindrical portion of the socket when both are at the same temperature and unstressed, at least one of the crest diameter and the root diameter of the threaded portion of the pin being greater than the correlative diameter of the threaded portion of the socket when both are at the same temperature and unstressed, the diameters of said conical portion of the pin being greater than the diameters of the conical portion of the socket at equal distances from said abutting surface of the pin and the abutment in the socket respectively when both are at the same temperature and unstressed, the threads of said pin and socket being of equal pitch when at the same temperature and unstressed and the inter-thread spaces on each of the pin and socket respectively being wider than the thickness of the threads on the correlative socket and pin, said pin and socket being made up together with said abutting surface against said abutment and with said pin in axial compression from said abutting surface through said threaded portion thereof and said socket in axial tension from said abutment through said threaded portion thereof.

18. A pipe connection comprising a drill pipe having on its exterior near one end a threaded portion formed on a cylindrical base and a smooth cylindrical portion on the side of the threaded portion nearest the end of the pipe, said pipe having an abutting surface perpendicular to the axis of the pipe for limiting axial movement of the pipe, said surface lying nearer said end of the pipe than said smooth cylindrical portion, and a tool joint part having on its interior near one end a threaded portion formed on a cylindrical base and a smooth cylindrical portion on the side of the threaded portion of the tool joint part farthest from said end of the tool joint part, and an abutment inside said tool joint part on the side of the smooth cylindrical portion thereof opposite said threaded portion thereof, said abutment having a surface lying in a plane perpendicular to the axis of the tool joint part, the diameter of said smooth cylindrical portion of the pipe being greater than the diameter of said smooth cylindrical portion of the tool joint part when both are at the same temperature and unstressed, at least one of the crest diameter and the root diameter of the threaded portion of the pipe being greater than the correlative diameter of the threaded portion of the tool joint part when both are at the same temperature and unstressed, said pipe and tool joint part being connected together with said threaded portion of the pipe lying within said threaded portion of the tool joint part with the thread of the pipe lying in the space between adjacent portions of the thread of the tool joint part, said abutting surface on the pipe lying against said surface of the abutment in the tool joint part, and said smooth cylindrical portion of the pipe being in axial compression and lying within said smooth cylindrical portion of the tool joint part, the last said portion being in axial part tension, whereby the flanks of the pipe and tool joint part threads on the opposite sides of the threads from the ends of the pipe and tool joint part, respectively, are placed in tight engagement and tension on the connection tightens the engagement of said smooth cylindrical portions.

19. A pipe connection comprising a drill pipe having on its exterior near one end a threaded portion formed on a cylindrical base, and a smooth conical portion on the side of the threaded portion farthest from said end of the pipe having a taper substantially equal to the critical taper, said pipe having an abutting surface for limiting axial movement of the pipe, said surface forming the extreme end of said pipe and lying in a plane perpendicular to the axis thereof, and a tool joint part having on its interior near one end a threaded portion formed on a cylindrical base, a smooth conical portion on the side of the threaded portion nearest said end of the tool joint part having a taper substantially the same as that of said tapered portion of the pipe, and an abutment inside said tool joint part on the side of said threaded portion farthest from said end of the tool joint part, said abutment having a surface lying in a plane perpendicular to the axis of the tool joint part, at least one of the crest diameter and the root diameter of the threaded portion of the pipe being greater than the correlative diameter of the threaded portion of the tool joint part when both are at the same temperature and unstressed, the diameters of said conical portion of the pipe being greater than the diameters of said conical portion of the tool joint part at equal distances from said abutting surface of the pipe and the abutment in the tool joint part respectively when both are at the same temperature and unstressed, said pipe and tool joint part being connected together with said threaded portion of the pipe lying within said threaded portion of the tool joint part with the thread of the pipe lying in the space between adjacent portions of the thread of the tool joint part and said abutting surface of the pipe lying against said abutment surface of said abutment in the tool joint part and said smooth conical portion of the pipe lying within said smooth conical portion of the tool joint part, said pipe being in axial compression from said abutting surface through said threaded portion thereof and said tool joint part being in axial tension from said abutment through said threaded portion thereof, whereby said tapered portion will tend to damp out transverse vibrations but will allow said tapered portion to be in tight engagement at the same time said end of the pipe is in engagement with said abutment and said abutment positively prevents said pipe from being screwed too far into said tool joint part and thereby prevents the pipe end from being crushed.

20. In combination, a drill pipe having on its exterior near one end a threaded portion formed on a cylindrical base, said pipe having a smooth annular abutting surface of revolution for limiting axial movement of the pipe, said surface lying nearer said end of the pipe than said threaded portion, and a tool joint part having on its interior near one end a threaded portion formed on a cylindrical base and an annular abutment inside said tool joint part on the side of said threaded portion farthest from said end of the tool joint part, said abutment having a smooth annular surface of revolution with respect to the axis of said tool joint part, the thread on the pipe being higher than the thread on the tool joint part, the crest diameter of the threaded portion of the pipe being greater than the root diameter of the threaded portion of the tool joint part when both are at the same temperature and unstressed, the area of the threaded portion of the pipe which has a greater diameter than the correlative diameter of the tool joint part as aforesaid and also the correlative area of the tool joint part being smooth cylindrical surfaces appearing in cross-section as a flat topped thread engaging a flat inter-thread-root space, said pipe and tool joint part being connected together with said threaded portion of the pipe lying within said threaded portion of the tool joint part with the thread of the pipe lying in the space between adjacent portions of the thread of the tool joint part and said abutting surface of the pipe lying against said abutment in the tool joint part, said pipe being in axial compression from said abutting surface through said threaded portion thereof and said tool joint part being in axial tension from said abutment through said threaded portion thereof.

21. In combination, a drill pipe having on its exterior near one end a threaded portion formed on a cylindrical base, said pipe having an abutting surface for limiting axial movement of the pipe, said surface lying nearer said end of the pipe than said threaded portion, and a tool joint part having on its interior near one end a threaded portion formed on a cylindrical base, and an abutment inside said tool joint part on the side of said threaded portion farthest from said end of the tool joint part, the threads of said pipe and tool joint part having sloping flank surfaces on the sides of the threads opposite from said ends of the pipe and tool joint part respectively and being of equal pitch when at the same temperature and unstressed and the spaces between adjacent portions of the thread on the pipe being wider than the thickness of the thread on the tool joint part, the thread on the pipe being higher than the thread on the tool joint part, the crest diameter of the threaded portion of the pipe being greater than the root diameter of the threaded portion of the tool joint part when both are at the same temperature and unstressed, the crest of the thread on said pipe and the inter-thread-root space on said tool joint part being smooth cylindrical surfaces appearing in cross-section as a flat topped thread to contact a flat interthread root space, said pipe and tool joint part being connected together with said threaded portion of the pipe lying within said threaded portion of the tool joint part with the thread of the pipe lying in the space between adjacent portions of the thread of the tool joint part and said abutting surface of the pipe lying against said abutment in the tool joint part, said pipe being in axial compression from said abutting surface through said threaded portion thereof and said tool joint part being in axial tension from said abutment through said threaded portion thereof.

CLAUDE L. GRIFFIN.

References Cited in the file of this patent

UNITED STATES PATENTS

| Number | Name | Date |
|---|---|---|
| 138,277 | Peet | Apr. 29, 1873 |
| 1,407,335 | Reynolds | Feb. 21, 1922 |
| 1,907,522 | Eaton | May 9, 1933 |
| 1,927,656 | Eaton | Sept. 19, 1933 |
| 2,054,118 | Childs | Sept. 15, 1936 |
| 2,144,928 | Moncrieff | Jan. 24, 1939 |
| 2,211,179 | Stone | Aug. 13, 1940 |
| 2,341,670 | Stinson | Feb. 15, 1944 |
| 2,539,057 | Brown | Jan. 23, 1951 |